(12) United States Patent
Lee et al.

(10) Patent No.: US 12,508,276 B2
(45) Date of Patent: Dec. 30, 2025

(54) USE OF GINSENOSIDE M1 FOR TREATING HUNTINGTON'S DISEASE

(71) Applicant: Sheau-Long Lee, Taoyuan (TW)

(72) Inventors: Sheau-Long Lee, Taoyuan (TW); Kuo-Feng Hua, I-Lan (TW); Yu-Chieh Lee, Taoyuan (TW)

(73) Assignee: Sheau-Long Lee, Taoyuan (TW)

( * ) Notice: Subject to any disclaimer, the term of this patent is extended or adjusted under 35 U.S.C. 154(b) by 0 days.

(21) Appl. No.: 16/960,932

(22) PCT Filed: Apr. 23, 2019

(86) PCT No.: PCT/CN2019/083838
§ 371 (c)(1),
(2) Date: Jul. 9, 2020

(87) PCT Pub. No.: WO2019/206126
PCT Pub. Date: Oct. 31, 2019

(65) Prior Publication Data
US 2021/0100823 A1    Apr. 8, 2021

Related U.S. Application Data

(60) Provisional application No. 62/661,244, filed on Apr. 23, 2018.

(51) Int. Cl.
*A61K 31/704* (2006.01)
*A61P 25/14* (2006.01)

(52) U.S. Cl.
CPC ........... *A61K 31/704* (2013.01); *A61P 25/14* (2018.01)

(58) Field of Classification Search
CPC .................. A61K 31/70; A61P 25/14
See application file for complete search history.

(56) References Cited

U.S. PATENT DOCUMENTS

| | | | |
|---|---|---|---|
| 6,087,363 A | * | 7/2000 | Longley ............... A61K 31/497 514/255.05 |
| 9,278,931 B2 | * | 3/2016 | Tomita ................. C07D 231/26 |
| 2017/0049792 A1 | * | 2/2017 | Lee ......................... A61P 37/00 |

FOREIGN PATENT DOCUMENTS

| KR | 10-0448667 B1 | 9/2004 |
|---|---|---|
| WO | WO 2004/002494 A1 | 1/2004 |

OTHER PUBLICATIONS

Schulte, Curr Trends Neurol. Jan. 1, 2011; 5:65-78. (Year: 2011).*
Mills, Is There a Link Between Alzheimer's, Parkinson's, and Huntington's Diseases? Health News, Jun. 14, 2017, https://www.healthline.com/health-news/link-between-alzheimers-parkinsons-and-huntingtons, internet article. (Year: 2017).*
International Search Report for PCT/CN2019/083838 mailed on Jul. 11, 2019.
Written Opinion of the International Searching Authority PCT/CN2019/083838 mailed on Jul. 11, 2019.

* cited by examiner

*Primary Examiner* — Layla D Berry
(74) *Attorney, Agent, or Firm* — Birch, Stewart, Kolasch & Birch, LLP

(57) ABSTRACT

Use of ginsenoside M1 for manufacturing a medicament for treating Huntington's disease (HD) in a subject in need; and a pharmaceutical composition for use in treating HD comprising ginsenoside M1 and a pharmaceutically acceptable carrier.

2 Claims, 9 Drawing Sheets

USE OF GINSENOSIDE M1 FOR TREATING HUNTINGTON'S DISEASE

RELATED APPLICATIONS

This application is the National Phase of PCT International Application No. PCT/CN2019/083838, filed on Apr. 23, 2019, which claims priority under 35 U.S.C. 119(e) to U.S. Provisional Application No. 62/661,244, filed on Apr. 23, 2018, all of which are hereby expressly incorporated by reference into the present application.

FIELD OF THE INVENTION

The present invention relates to a new use of ginsenoside M1 for treating Huntington's disease (HD).

BACKGROUND OF THE INVENTION

Huntington's disease (HD) is an autosomal dominant neurodegenerative disease caused by an abnormal CAG trinucleotide repeat expansion in the huntingtin gene. The disease manifests clinically as progressive involuntary movement disorders, dementia, and eventual death. To date, no effective treatment for HD is currently available yet.

Ginsenosides, the main active ingredients of ginseng, are known to have a variety of pharmacological activities, e.g. antitumor, antifatigue, antiallergic and antioxidant activities. Ginsenosides share a basic structure, composed of gonane steroid nucleus having 17 carbon atoms arranged in four rings. Ginsenosides are metalized in the body, and a number of recent studies suggest that ginsenoside metabolites, rather than naturally occurring ginsenosides, are readily absorbed in the body and act as the active components. Some ginsenosides have been reported to have beneficial effects against some neurodegenerative and aging disorders. Among them, ginsenoside M1, also named Compound K (CK), is known as one metabolite of protopanaxadiol-type ginsenosides via the gypenoside pathway by human gut bacteria. Until now, no prior art references report the effect of ginsenoside M1 in the HD treatment.

BRIEF SUMMARY OF THE INVENTION

In the present invention, it is unexpected found that ginsenoside M1 is effective in alleviating one or more symptoms of Huntington's disease (HD). Therefore, the present invention provides a new approach for treatment HD in a subject.

Therefore, the present invention provides a method for treating Huntington's disease (HD) in a subject in need thereof comprising administering to an effective amount of ginsenoside M1 to the subject.

In some embodiments, the subject expresses a mutant HTT protein, particularly the mutant HTT protein is accumulated in neurons of the subject.

In some embodiments, the ginsenoside M1 is administered in an amount effective in (i) reducing reactive oxygen species (ROS) production and/or (ii) reducing cytotoxicity, particularly in the neurons of the subject, and/or (iii) improving motor coordination, (iv) prolong the lifespan, and/or (v) reducing the mHtt aggregate formation in the striatum of the subject.

In some embodiments, ginsenoside M1 is administered by parenteral or enteral route. The details of one or more embodiments of the invention are set forth in the description below. Other features or advantages of the present invention will be apparent from the following detailed description of several embodiments, and also from the appending claims.

BRIEF DESCRIPTION OF THE DRAWINGS

For the purpose of illustrating the invention, there are shown in the drawings embodiments. It should be understood, however, that the invention is not limited to the preferred embodiments shown. In the drawings:

(FIG. 1A) STHdhQ7 and STHdhQ109 cells were treated with 30 μM ginsenoside M1 or vehicle (0.1% DMSO) for 24 h. Survival rate of STHdhQ7 and STHdhQ109 cells was quantified by the MTT reduction assay. (FIG. 1B) STHdhQ109 cells were treated with 1-30 μM ginsenoside M1 or vehicle (0.1% DMSO) for 24 h. Survival rate of STHdhQ109 cells was quantified by the MTT reduction assay. The results are express as the means±SEM of triplicate samples. Multiple groups will analyze with one-way analysis of variance (ANOVA), follow by a post-hoc Student-Newman-Keuls test. p value of <0.05 will considered significant. $^a p<0.05$: between STHdhQ7 and STHdhQ109 cells (FIG. 1A), or compared to untreated (vehicle-treated) STHdhQ7 cells (FIG. 1B). $^b p<0.05$: compared to untreated (vehicle-treated) STHdhQ109 cells.

DETAILED DESCRIPTION OF THE INVENTION

Figure 1A:
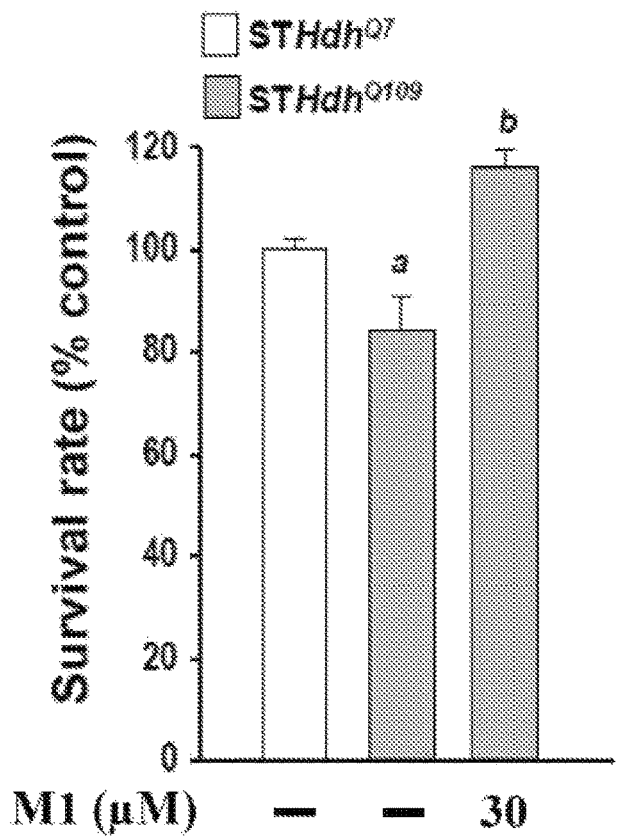
FIGS. 1A-1B show that ginsenoside M1 markedly reduced the cytotoxicity in mHtt expression cells.

Unless defined otherwise, all technical and scientific terms used herein have the meaning commonly understood by a person skilled in the art to which this invention belongs. As used herein, the following terms have the meanings ascribed to them unless specified otherwise.

The articles "a" and "an" are used herein to refer to one or more than one (i.e., at least one) of the grammatical object of the article. By way of example, "an element" means one element or more than one element.

The term "comprise" or "comprising" is generally used in the sense of include/including which means permitting the presence of one or more features, ingredients or components. The term "comprise" or "comprising" encompasses the term "consists" or "consisting of."

Huntington's disease (HD) is an autosomal dominant neurodegenerative disease that manifests clinically as progressive involuntary movement disorders, dementia, and eventual death [1]. It is caused by CAG trinucleotide expansion in exon 1 of the huntingtin (Htt) gene, which is located on the short arm of human chromosome 4 (4p63). When the number of CAG repeats exceeds 36, the translated polyglutamine (polyQ)-containing the Htt protein [mutant Htt (mHtt)] interferes with the normal functions of many cellular proteins and subsequently jeopardizes important cellular machinery [2]. Abnormal accumulation of polyQ-expanded mutant Htt also leads to aggregate formation in the nuclei of neurons, astrocytes, cochlear neurons, and many different types peripheral cells [3]. Mutant Htt is known to promote protein misfolding and thus inhibit the activity of proteosome activity, dysregulates transcription, impairs synaptic functions, elevates oxidative stress, degenerates axons, and eventually lead to in neurodegeneration and neuronal loss [3]. Extensive release of glutamate from the cortico-striatal terminals and impairment of neuronal survival are believed to account for striatal neurodegeneration which triggers the initial symptoms of HD. Dysfunction of the nigro-striatal pathway also contributes to striatal excitotoxicity. Together, the neuronal degeneration induced by mutant Htt takes place mainly in nonstriatal brain regions (e.g. cortex and substantia nigra) [4, 5], and causes movement disorders, dementia, and eventual death [1, 6]. In addition to neuronal dysregulation, metabolic abnormalities are another important hallmark of HD [7]. Hyperglycemia and abnormal glucose metabolism were observed in several mouse models of HD and in patients with HD [8]. Deficiencies in several other metabolic pathways (e.g., cholesterol biosynthesis and urea cycle metabolism) are also well documented [9, 10]. Deficit of energy metabolism had been proposed as an important pathogenic factor for many neurological disorders. Lately, energy deficit emerged as an important pathogenic factor in HD [7]. Hyperglycemia and reduced insulin had been reported in several transgenic mouse models [8]. Aberrant expressions of proteins associating with glucose metabolism had also been observed in several HD mouse models as well as in HD patients [8].

AMP-activated protein kinase (AMPK) is a major energy sensor that regulates an array of downstream target genes and maintains cellular energy homeostasis by activating energy production and inhibiting energy expenditure in many different tissues [11]. AMPK is a heterotrimeric complex compose of α, β, and γ subunit. The α and β subunits are each encoded by two different genes (α1 and α2 or β1 and β2), whereas the γ subunit is encoded by 3 genes (γ1, γ2, and γ3) [12]. And AMPK can be activated by several upstream kinases [calmodulin-dependent protein kinase kinase (CaMKK) and LKB1] via the phosphorylation of its threonine residue 172 within the catalytic domain of the α subunit [13]. Other kinases [including the cAMP-dependent kinase (PKA) and Ca$^{2+}$/calmodulin-dependent protein kinase II (CaMKII)] were also shown to regulate the activity of AMPK [14, 15]. Activation of AMPK by LKB1 is mainly triggered by an increase in the cellular ratio of AMP/ATP [16]. In contrast, CaMKK and CaMK II activate AMPK during stimulations which elevate levels of intracellular calcium [17]. The α subunit of AMPK is the catalytic subunit and has at least two different isoforms (α1 and α2). AMPK-α1 is widely expressed in the entire body and the α2 subunit is predominantly expressed in the liver, heart, and skeletal muscle [18]. The substrates of AMPK include many proteins in energy metabolism and proteins involved in many different machineries [19]. For example, AMPK activation was found to elevate the formation of ROS, and subsequently caused mitochondria damages and apoptosis [20, 21]. AMPK also phosphorylates a wide variety of proteins involved in other cellular functions, such as transcription and secretion [19, 22]. The pro-apoptotic effects of AMPK activation in various cells include induction of stress signalling (including p53, JNK, caspase-3, p38 and mTOR) and inhibition of fatty acid synthase and protein synthesis [23-26]. In addition, AMPK has been found to suppress axon initiation and neuronal polarization via the PI3K (phosphatidylinositol 3-kinase) pathway. Phosphorylation of a motor protein (Kif5) by AMPK disrupted the association of Kif5 with PI3K, prevented the targeting of PI3 to axons, and therefore inhibited axonal growth and neuronal polarization [27].

In the brain, AMPK exists in hypothalamic neurons and plays a critical role in the regulation of food intake [28]. Interestingly the function and regulation of AMPK and its role in neurodegenerative diseases have attracted much attention. For example, higher activities of AMPK were found in neurons with ischemia, HD, and Alzheimer's disease (AD). In the brain of stroke patients, AMPK is activated in the cortical and hippocampal neurons. Inhibition of AMPK reduced stock damage [29-31]. Deletion of AMPK-α2 is neuroprotective in the brain under ischemia [32]. Higher activities of AMPK were also found in neurons of patients with AD. A recent study reported by Chen et al. demonstrated that, metformin (an activator of AMPK) enhances the biogenesis of amyloid peptides via up-regulation of β-secretase (BACE1) in an AMPK-dependent pathway, which potentially might worsen the progression of AD [33]. Inhibition of AMPK significantly suppresses metformin's effect on Aβ generation and BACE1 transcription. Thornton et al. has demonstrated AMPK is a tau kinase, AMPK induced tau phosphorylation in the microtubule-binding domain. In addition, the AMPK induced phosphorylation of tau inhibited the binding of tau to microtubules [34]. These authors also found that AMPK-α1, but not AMPK-α2, was significantly activated in response to Aβ1-42 [34]. Vingtdeux et al. demonstrated that phospho-AMPK was co-localized with tau which is phosphorylated at $Ser^{202}$ or $Ser^{396}$ in AD brain [35]. In addition, exposure to amyloid β peptides (Aβs, the key components of senile plaques in AD) led to activation of AMPK which phosphorylates tau at $Thr^{231}$ and $Ser^{396/404}$, and might contribute to AD tauopathy [34, 35]. These observations suggest a pathological role of AMPK activation in AD because hyperphosphorylation of tau is a hallmark of AD. Consistently, inhibition of AMPK suppresses the production of Aβ and tau phosphorylation [33, 36]. Those studies suggest that activation of AMPK in AD might contribute to neurodegeneration in AD.

The roles and regulation of AMPK in HD pathogenesis was actively investigated. We previously report that activation of the a1 isoform of AMPK (AMPK-α1) occurred in striatal neurons of humans and mice with HD [31, 37]. Over-activation of AMPK in the striatum caused brain atrophy, facilitated neuronal loss, and increased formation of Htt aggregates in a transgenic mouse model (R6/2) of HD [37]. Such nuclear accumulation of AMPK-α1 was activity dependent. Prevention of nuclear translocation or inactivation of AMPK-α1 ameliorated cell death caused by mutant Htt. Aberrant activation of AMPK-al in the nuclei of striatal cells represents a new toxic pathway induced by mutant Htt. Blocking the activation and nuclear enrichment of AMPK-α1 using an adenosine 2A receptor ($A_{2A}R$)-selective agonist (CGS21680) via cAMP/PKA-dependent pathway was associated with the rescue of brain atrophy [31, 37], further strengthening the involvement of AMPK-α1 in HD pathogenesis in the striatum.

ATM is a large (~370-kDa) serine/threonine protein kinase. ATM is activated by DNA damage in an MRN (Mre11-Rad50-Nbs1) dependent manner. Although the function of these proteins has been well documented, the functions in controlling cellular energy homeostasis and detailed molecular mechanisms are largely uncharacterized, which greatly hinders the development of treatments aimed at brain energy deficiency. Over the past several years, the correlation of oxidative stress and DNA damage has been demonstrated. ATM was induced by oxidative stress via oxidation of cysteine residues [38]. Moreover, oxidative stress induces DNA repair dysfunction by impairment of the DNA-PK complex in HD. Overexpression of a 43Q-GFP fusion protein was found to increase ROS production and ATM activity, and subsequently evoked the ATM-dependent DNA damage in PC12 cells [39]. ATM has been found to involve in the phosphorylation of AMPK, suggesting that AMPK may play a critical role in response to DNA damage or DNA repair. IGF-1 induced AMPK phosphorylation in human fibroblast and mouse embryonic fibroblast cells via an ATM-dependent and LKB1-independent manner [40]. AICAR or IR induce activation of AMPK was via ATM-dependent pathway in HeLa cells and cancer cells [41, 42]. Fu et al. further reported that activation of ATM by etoposide induces ROS production and mitochondrial biogenesis through phosphorylation/activation of AMPK. ROS might promote mitochondrial biogenesis via a DNA damage/ATM/AMPK pathway [43].

In the present invention, it is unexpected found that ginsenoside M1 effective in alleviating one or more symptoms of HD. In particular, it is demonstrated that ginsenoside M1 can reduce the cytotoxicity in mHtt expression cells, the reactive oxygen species (ROS) production in $STHdh^{Q109}$ cells, the phosphorylation level of AMPK in $STHdh^{Q109}$ cells, the phosphorylation level of ATM in $STHdh^{Q109}$ cells, the expression level of γH2AX in $STHdh^{Q109}$ cells, and the phosphorylation level of p53 in $STHdh^{Q109}$ cells. It is also demonstrated that in a transgenic mouse model of HD (R6/2 mice), oral administration of ginsenoside M1 can reduce the disease progression, improve motor coordination, prolong the lifespan and reduce the mHtt aggregate formation in the striatum of the diseased animal.

Therefore, the present invention provides a method for treating or preventing Huntington's disease (HD) a subject in need thereof comprising administering to an effective amount of ginsenoside M1 to the subject.

Ginsenoside M1, also named Compound K (CK), 20-O-β-D-glucopyranosyl-20(S)-protopanaxadiol, is one of saponin metabolites known in the art. The chemical structure of ginsenoside M1 is as follows:

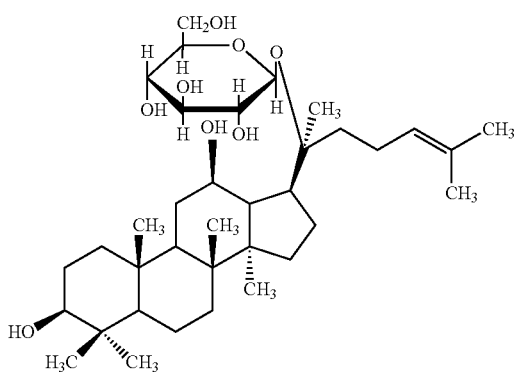

Ginsenoside M1 is known as one metabolite of protopanaxadiol-type ginsenosides via the gypenoside pathway by human gut bacteria. Ginsenoside M1 can be found in blood or urine after intake. Ginsenoside M1 may be prepared from *ginseng* plants through fungi fermentation by methods known in the art, such as Taiwan Patent Application No. 094116005 (1280982) and U.S. Pat. No. 7,932,057, the entire content of which is incorporated herein by reference. In certain embodiments, the *ginseng* plants for preparing the ginsenoside M1 include Araliaceae family, *Panax* genus, e.g. *P. ginseng* and *P. pseudo-ginseng* (also named Sanqi). In general, the method of preparation of ginsenoside M1 includes the steps of (a) providing powder of *ginseng* plant materials (e.g. leaves or stems); (b) providing a fungus for fermenting the *ginseng* plant materials, wherein the fermentation temperature is ranged from 20-50° C., the fermentation humidity is ranged from 70-100%, the pH value is ranged from 4.0-6.0, and the fermentation period is ranged from 5-15 days; (c) extracting and collecting the fermentation products; and (d) isolating 20-O-β-D-glucopyranosyl-20(S)-protopanaxadiol from the fermentation products.

When ginsenoside M1 is described as "isolated" or "purified" in the present invention, it should be understood as not absolutely isolated or purified, but relatively isolated or purified. For example, purified ginsenoside M1 refers to one that is more purified compared to its naturally existing form. In one embodiment, a preparation comprising purified ginsenoside M1 may comprise ginsenoside M1 in an amount of more than 50%, more than 60%, more than 70%, more than 80%, more than 90%, or 100% (w/w) of the total preparation. It should be understood that when a certain number was used herein to show a ratio or dosage, said number generally includes that within the range of 10% more and less, or more specifically, the scope of 5% more and less than the number.

As used herein, the term "huntingtin", "huntingtin protein", or "HTT" refers to the huntingtin protein encoded by the huntingtin gene also called HTT gene or HD gene. There are polymorphisms of this gene due to a variable number of CAG codon repeats, encoding glutamine, in the first exon. In its wild-type form, this protein contains from 6 to 35 glutamine residues, which does not cause Huntington's disease. In individuals affected by HD, this protein contains more than 35 glutamine residues and is named polyQ-htt, a mutant form that contributes to Huntington's disease. The wild-type form of htt has a mass of about 350 kD and a size of about 3144 amino acids. Unless otherwise specified, the term "htt", as used herein, refers to the wild-type form of the htt protein, i.e. htt containing a polyglutamine tract of less than 36 glutamine residues. A mutant HTT protein has abnormal function and/or activity or an additional activity or function as compared to the non-mutant, wild-type HTT protein, (e.g., aggregation, aggregation with transcription factors, etc.).

The term "individual" or "subject" used herein includes human and non-human animals such as companion animals (such as dogs, cats and the like), farm animals (such as cows, sheep, pigs, horses and the like), or laboratory animals (such as rats, mice, guinea pigs and the like).

The term "treating" as used herein refers to the application or administration of a composition including one or more active agents to a subject afflicted with a disorder, a symptom or conditions of the disorder, or a progression of the disorder, with the purpose to cure, heal, alleviate, relieve, alter, remedy, ameliorate, improve, or affect the disorder, the symptoms or conditions of the disorder, the disabilities induced by the disorder, or the progression of the disorder or the symptom or condition thereof. The term "preventing" or "prevention" as used herein refers to application or administration of a composition including one or more active agents to a subject who is susceptible or predisposed to a disorder or a symptom or condition thereof and thus relates to prevention of the occurrence of the disorder or the symptom or condition thereof or underlying causes thereof.

The term "effective amount" used herein refers to the amount of an active ingredient to confer a desired therapeutic effect in a treated subject. For example, an effective amount for treating or preventing HD can be an amount that can prohibit, improve, alleviate, reduce or prevent one or more symptoms or conditions or progression thereof. In some embodiments, an effective amount as used herein can be an amount effective in reducing reactive oxygen species (ROS) production and cytotoxicity in neuronal cells (particular mutated neuronal) of the HD subject. In some embodiments, an effective amount as used herein can be an amount effective in improving motor coordination, prolong the lifespan and reduce the mHtt aggregate formation in the striatum of the HD subject.

The therapeutically effective amount may change depending on various reasons, such as administration route and frequency, body weight and species of the individual receiving said pharmaceutical, and purpose of administration. Persons skilled in the art may determine the dosage in each case based on the disclosure herein, established methods, and their own experience. For example, in certain embodiments, the oral dosage of ginsenoside M1 used in the present invention is 10 to 1,000 mg/kg daily. In some examples, the oral the oral dosage of ginsenoside M1 used in the present invention is 100 to 300 mg/kg daily, 50 to 150 mg/kg daily, 25 to 100 mg/kg daily, 10 to 50 mg/kg daily, or 5 to 30 mg/kg daily. In addition, in some embodiments of the invention, ginsenoside M1 is administered periodically for a certain period of time, for example, daily administration for at least 15 days, one month or two months or longer.

According to the present invention, ginsenoside M1 may be used as an active ingredient for treating or preventing Huntington's disease (HD). In one embodiment, a therapeutically effective amount of the active ingredient may be formulated with a pharmaceutically acceptable carrier into a pharmaceutical composition of an appropriate form for the purpose of delivery and absorption. Depending on the mode of administration, the pharmaceutical composition of the present invention preferably comprises about 0.1% by weight to about 100% by weight of the active ingredient, wherein the percentage by weight is calculated based on the weight of the whole composition.

As used herein, "pharmaceutically acceptable" means that the carrier is compatible with the active ingredient in the composition, and preferably can stabilize said active ingredient and is safe to the individual receiving the treatment. Said carrier may be a diluent, vehicle, excipient, or matrix to the active ingredient. Some examples of appropriate excipients include lactose, dextrose, sucrose, sorbose, mannose, starch, Arabic gum, calcium phosphate, alginates, tragacanth gum, gelatin, calcium silicate, microcrystalline cellulose, polyvinyl pyrrolidone, cellulose, sterilized water, syrup, and methylcellulose. The composition may additionally comprise lubricants, such as talc, magnesium stearate, and mineral oil; wetting agents; emulsifying and suspending agents; preservatives, such as methyl and propyl hydroxybenzoates; sweeteners; and flavoring agents. The composition of the present invention can provide the effect of rapid, continued, or delayed release of the active ingredient after administration to the patient.

According to the present invention, the form of said composition may be tablets, pills, powder, lozenges, packets, troches, elixers, suspensions, lotions, solutions, syrups, soft and hard gelatin capsules, suppositories, sterilized injection fluid, and packaged powder.

The composition of the present invention may be delivered via any physiologically acceptable route, such as oral, parenteral (such as intramuscular, intravenous, subcutaneous, and intraperitoneal), transdermal, suppository, and intranasal methods. Regarding parenteral administration, it is preferably used in the form of a sterile water solution, which may comprise other substances, such as salts or glucose sufficient to make the solution isotonic to blood. The water solution may be appropriately buffered (preferably with a pH value of 3 to 9) as needed. Preparation of an appropriate parenteral composition under sterile conditions may be accomplished with standard pharmacological techniques well known to persons skilled in the art, and no extra creative labor is required.

According to the present invention, ginsenoside M1 or compositions comprising ginsenoside M1 as the active ingredient may be used in treating individuals with Huntington's disease (HD) or at risk of Huntington's disease (HD). Specifically, ginsenoside M1 or compositions comprising ginsenoside M1 as the active ingredient may be administered to individuals with HD or individuals at the risk of acquiring HD, so as to prevent occurrence of the disease or improve the symptoms or delay deterioration of the symptoms.

The present invention is further illustrated by the following examples, which are provided for the purpose of demonstration rather than limitation. Those of skill in the art should, in light of the present disclosure, appreciate that many changes can be made in the specific embodiments which are disclosed and still obtain a like or similar result without departing from the spirit and scope of the invention.

EXAMPLE

Ginsenoside M1, also named Compound K (CK), 20-O-β-D-glucopyranosyl-20(S)-protopanaxadiol (named LCHK168 below), was prepared by methods known in the art, such as those described in Taiwan Patent Application No. 094116005 (1280982) and U.S. Pat. No. 7,932,057.

In the present study we have investigated the efficacy and associated mechanisms of ginsenoside M1 in vitro and in vivo. We demonstrated that ginsenoside M1 reduced the cytotoxicity in mHtt expression cells, reduced the reactive oxygen species (ROS) production in STHdh$^{Q109}$ cells, reduced the phosphorylation level of AMPK in STHdh$^{Q109}$ cells, reduced the phosphorylation level of ATM in STHdh$^{Q109}$ cells, reduced the expression level of γH2AX in STHdh$^{Q109}$ cells, and reduced the phosphorylation level of p53 in STHdh$^{Q109}$ cells. In addition, we demonstrated that oral administration of ginsenoside M1 reduced the disease progression of a transgenic mouse model of HD (R6/2 mice), prolonged the lifespan of a transgenic mouse model of HD (R6/2 mice) and reduced the mHtt aggregate formation in the striatum of HD disease mice (R6/2 mice).

Figure 1B:
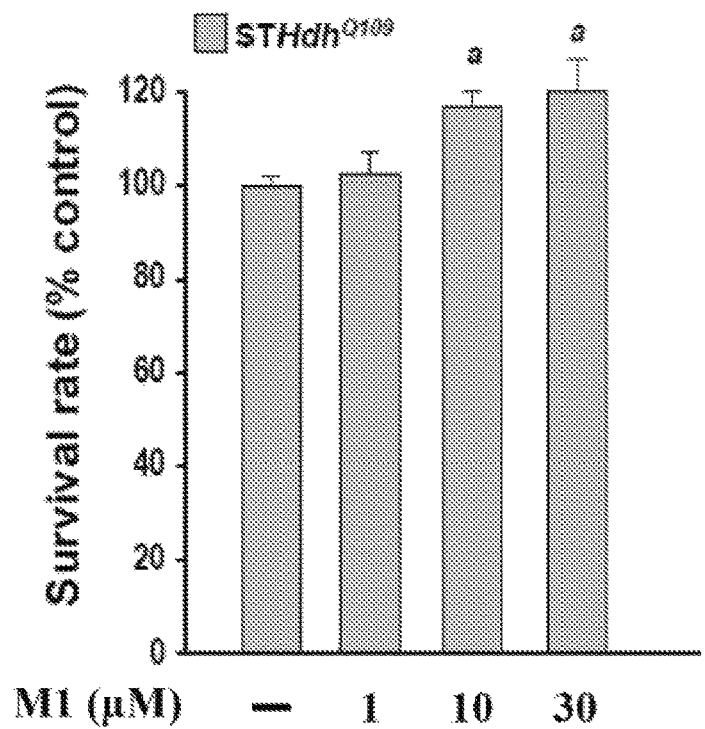
Figure 2:
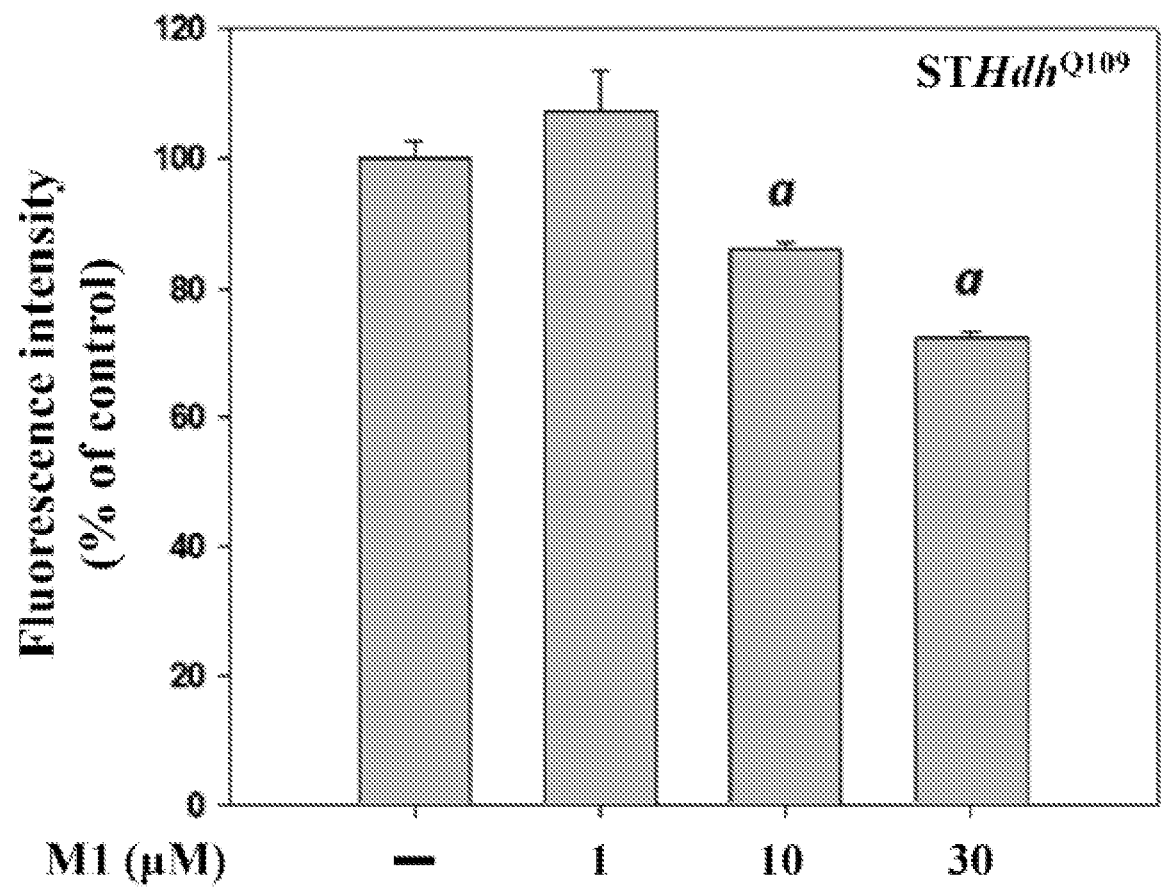
FIG. 2 shows that ginsenoside M1 markedly reduced the ROS production in STHdhQ109 cells. STHdh$^{Q109}$ cells were treated with 1-30 μM ginsenoside M1 or vehicle (0.1% DMSO) in the presence of 10 μM intracellular ROS indicator H$_2$DCFDA for 1 h. Cellular ROS contents were measured by detecting the fluorescence intensity using a fluorescence plate reader. The results are express as the means±SEM of triplicate samples. Multiple groups will analyze with one-way analysis of variance (ANOVA), follow by a post-hoc Student-Newman-Keuls test. p value of <0.05 will considered significant. $^a p<0.05$: compared to untreated (vehicle-treated) STHdh$^{Q109}$ cells.

Example 1: Ginsenoside M1 Markedly Reduced the Cytotoxicity in mHtt Expression Cells Conditionally immortalized wild-type STHdh$^{Q7}$ striatal neuronal progenitor cells expressing endogenous normal htt (referred to as wild-type striatal cells), and homozygous mutant STHdh$^{Q109}$ striatal neuronal progenitor cells from homozygous STHdh$^{Q109}$ knock-in mice expressing mutant htt with 109 glutamines (referred to as mutant striatal cells). STHdh$^{Q7}$ and STHdh$^{Q109}$ cells were generous gifts from Dr. Elena Cattaneo and Marta Valenza (Department of pharmacological sciences and centre for stem cell research, University of Milano, Italy). These cells were maintained in an incubation chamber at 33° C. in Dulbecco's modified Eagle's medium (DMEM) supplemented with 10% fetal bovine serum (FBS). STHdh$^{Q7}$ and STHdh$^{Q109}$ cells were treated with 30 μM ginsenoside M1 or vehicle (DMSO) for 24 h. STHdh$^{Q7}$ and STHdh$^{Q109}$ cells death was quantified by the MTT reduction assay. For the MTT reduction assay, 3-[4,5-dimethylthiazol-2-yl]-2,5-diphenyltetrazolium bromide (MTT) was dissolved in dimethyl sulfoxide (DMSO) at 50 mg/ml as a 100-fold stock solution. At the end of experiments, cells were incubated in culture medium with 0.5 mg/ml MTT at 37° C. for 2 h. The culture medium was then replaced with DMSO to dissolve the MTT formazan precipitates, which was followed by the measurement of the absorbance at 570 nm using a microplate reader (OPTImax tunable plate reader, Molecular Device, Sunnyvale, CA, USA). The survival rate of the indicated cells was normalized to those survival rate of untreated (vehicle-treated) STHdh$^{Q7}$ cells. As shown in the FIG. 1A, the survival rate of untreated (vehicle-treated) STHdh$^{Q109}$ cells was lower than that of untreated (vehicle-treated) STHdh$^{Q7}$ cells. Notably, incubation of STHdh$^{Q109}$ cells with 30 μM ginsenoside M1 significantly increased the survival rate compared to the untreated (vehicle-treated) STHdh$^{Q7}$ cells. To confirm the cyto-protective effect of ginsenoside M1, STHdh$^{Q109}$ cells were treated with 1, 10 and 30 μM ginsenoside M1 or vehicle (DMSO) for 24 h. As shown in the FIG. 1B, 10 and 30 μM ginsenoside M1 significantly increased the survival rate of STHdh$^{Q109}$ cells compared to the untreated (vehicle-treated) STHdh$^{Q7}$ cells. The results are express as the means±SEM of triplicate samples. Multiple groups will analyze with one-way analysis of variance (ANOVA), follow by a post-hoc Student-Newman-Keuls test. p value of <0.05 will considered significant. $^{a}$p<0.05: between STHdh$^{Q7}$ and STHdh$^{Q109}$ cells (FIG. 2A), or compared to untreated (vehicle-treated) STHdh$^{Q7}$ cells (FIG. 2B). $^{b}$p<0.05: compared to untreated (vehicle-treated) STHdh$^{Q109}$ cells.

Example 2: Ginsenoside M1 Markedly Reduced the Reactive Oxygen Species (ROS) Production in STHdhQ$^{109}$ Cells Oxidative stress is one of the important events triggers cell death in STHdh$^{Q109}$ cells. To investigate whether ginsenoside M1 inhibited cell death of STHdh$^{Q109}$ cells by reducing oxidative stress, STHdh$^{Q109}$ cells were treated with 1, 10 and 30 µM ginsenoside M1 or vehicle (DMSO) in the presence of 10 µM intracellular ROS indicator fluorescent probe 2,7-dichlorodihydrofluorescein diacetate (H$_2$DCFDA; Molecular Probes, Inc., Eugene, Oregon, USA) for 1 h. Cellular ROS contents were measured by detecting the fluorescence intensity (Excitation/Emission: 488 nm/510 nm) using a fluorescence plate reader (Fluoroskan Ascent; Thermo Electron Corporation, Woburn, MA, USA). As shown in the FIG. 2, 10 and 30 µM ginsenoside M1 significantly reduced the ROS production. The results are express as the means±SEM of triplicate samples. Multiple groups will analyze with one-way analysis of variance (ANOVA), follow by a post-hoc Student-Newman-Keuls test. p value of <0.05 will considered significant. $^a$p<0.05: compared to untreated (vehicle-treated) STHdh$^{Q109}$ cells.

Figure 3:
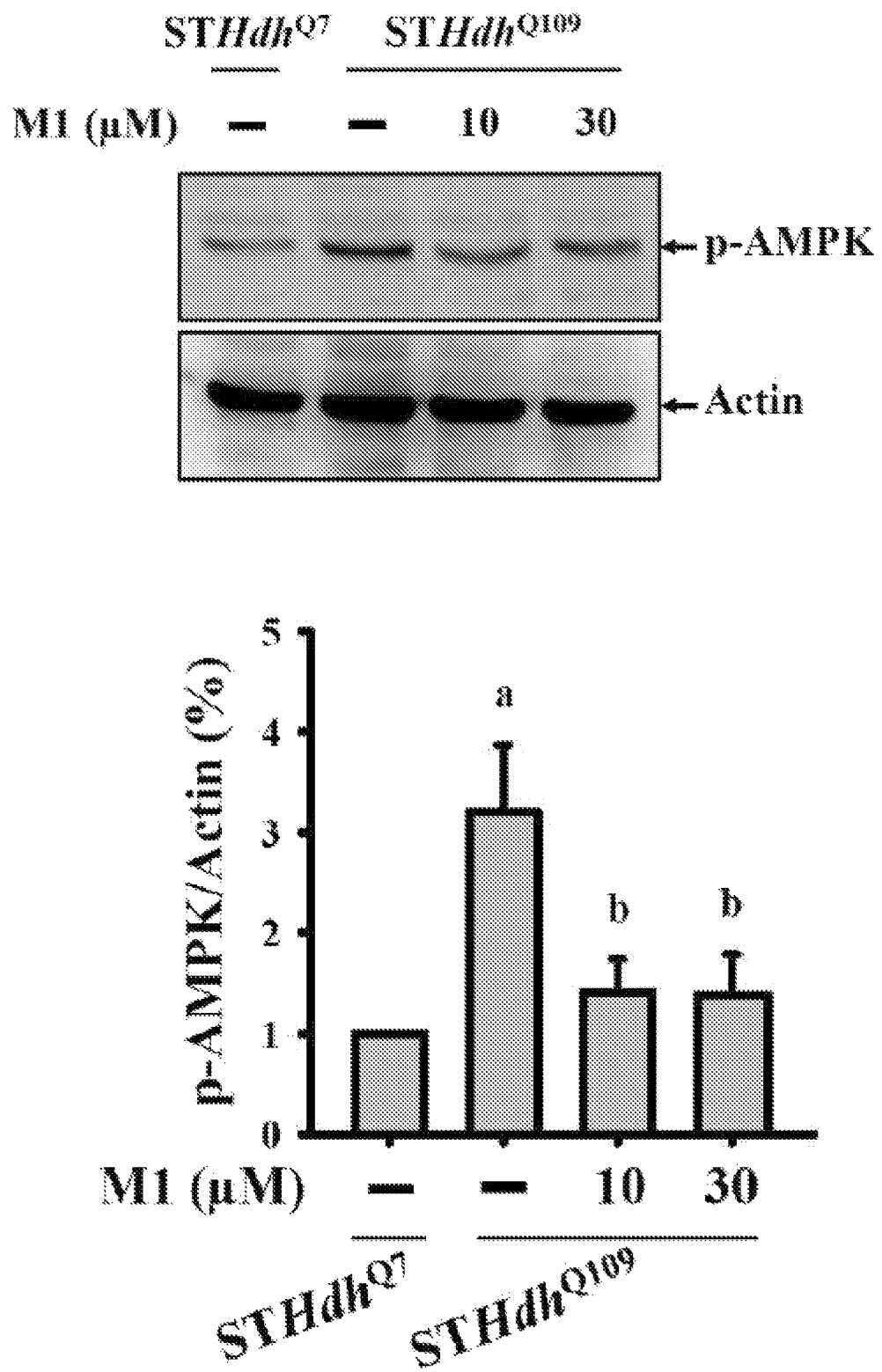
FIG. 3 shows that ginsenoside M1 markedly reduced the phosphorylation level of AMPK in STHdhQ109 cells. STHdh$^{Q7}$ and STHdh$^{Q109}$ cells were treated with 10 or 30 μM ginsenoside M1 or vehicle (0.1% DMSO) for 24 h. The phosphorylation level of AMPK was measured by Western blotting. The Western blotting results are representative of three different experiments and the histogram shows the quantification expressed as the mean±SEM for these three experiments. Multiple groups will analyze with one-way analysis of variance (ANOVA), follow by a post-hoc Student-Newman-Keuls test. p value of <0.05 will considered significant. $^a p<0.05$: between STHdh$^{Q7}$ and STHdh$^{Q109}$ cells. $^b$ p<0.05: compared to untreated (vehicle-treated) STHdh$^{Q109}$ cells.

Example 3: Ginsenoside M1 Markedly Reduced the Phosphorylation Level of AMPK in STHdh$^{Q109}$ Cells Activation of AMPK promotes the pathogenesis of HD [37]. To investigate whether ginsenoside M1 inhibited AMPK activation, STHdh$^{Q7}$ and STHdh$^{Q109}$ cells were treated with 10 and 30 µM ginsenoside M1 or vehicle (DMSO) for 24 h. The phosphorylation level of AMPK was measured by Western blotting. As shown in the FIG. 3, the phosphorylation level of AMPK in untreated (vehicle-treated) STHdh$^{Q109}$ cells was significantly increased compared to the untreated (vehicle-treated) STHdh$^{Q7}$ cells. Notably, 10 and 30 µM ginsenoside M1 significantly reduced the phosphorylation level of AMPK in STHdh$^{Q109}$ cells compared to the untreated (vehicle-treated) STHdh$^{Q109}$ cells. The Western blotting results are representative of three different experiments and the histogram shows the quantification expressed as the mean±SEM for these three experiments. Multiple groups will analyze with one-way analysis of variance (ANOVA), follow by a post-hoc Student-Newman-Keuls test. p value of <0.05 will considered significant. $^a$p<0.05: between STHdh$^{Q7}$ and STHdh$^{Q109}$ cells. $^b$p<0.05: compared to untreated (vehicle-treated) STHdh$^{Q109}$ cells.

Figure 4:
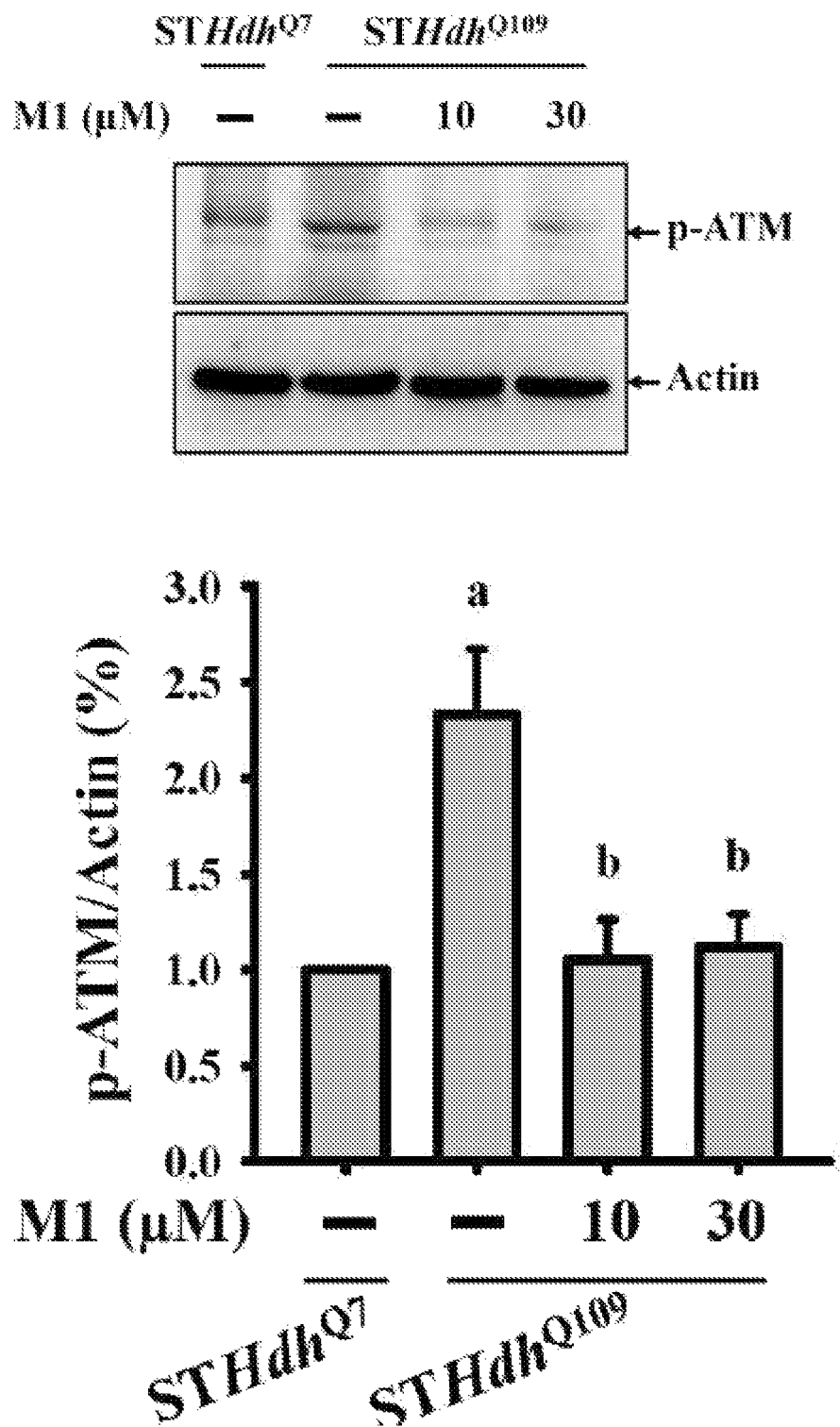
FIG. 4 shows that ginsenoside M1 markedly reduced the phosphorylation level of ATM in STHdhQ109 cells. STHdh$^{Q7}$ and STHdh$^{Q109}$ cells were treated with 10 or 30 μM ginsenoside M1 or vehicle (0.1% DMSO) for 24 h. The phosphorylation level of ATM was measured by Western blotting. The Western blotting results are representative of three different experiments and the histogram shows the quantification expressed as the mean±SEM for these three experiments. Multiple groups will analyze with one-way analysis of variance (ANOVA), follow by a post-hoc Student-Newman-Keuls test. p value of <0.05 will considered significant. $^a p<0.05$: between STHdh$^{Q7}$ and STHdh$^{Q109}$ cells. $^b$ p<0.05: compared to untreated (vehicle-treated) STHdh$^{Q109}$ cells.

Example 4: Ginsenoside M1 Markedly Reduced the Phosphorylation Level of ATM in STHdh$^{Q109}$ Cells ATM is activated by DNA damage and plays important role in the phosphorylation of AMPK. To investigate whether ginsenoside M1 inhibited ATM activation, STHdh$^{Q7}$ and STHdh$^{Q109}$ cells were treated with 10 and 30 µM ginsenoside M1 or vehicle (DMSO) for 24 h. The phosphorylation level of ATM was measured by Western blot. As shown in the FIG. 4, the phosphorylation level of ATM in untreated (vehicle-treated) STHdh$^{Q109}$ cells was significantly increased compared to the untreated (vehicle-treated) STHdh$^{Q7}$ cells. Notably, 10 and 30 µM ginsenoside M1 significantly reduced the phosphorylation level of ATM in STHdh$^{Q109}$ cells compared to the untreated (vehicle-treated) STHdh$^{Q109}$ cells. The Western blotting results are representative of three different experiments and the histogram shows the quantification expressed as the mean±SD for these three experiments. Multiple groups will analyze with one-way analysis of variance (ANOVA), follow by a post-hoc Student-Newman-Keuls test. p value of <0.05 will considered significant. $^a$p<0.05: between STHdh$^{Q7}$ and STHdh$^{Q109}$ cells. $^b$p<0.05: compared to untreated (vehicle-treated) STHdh$^{Q109}$ cells.

Figure 5:
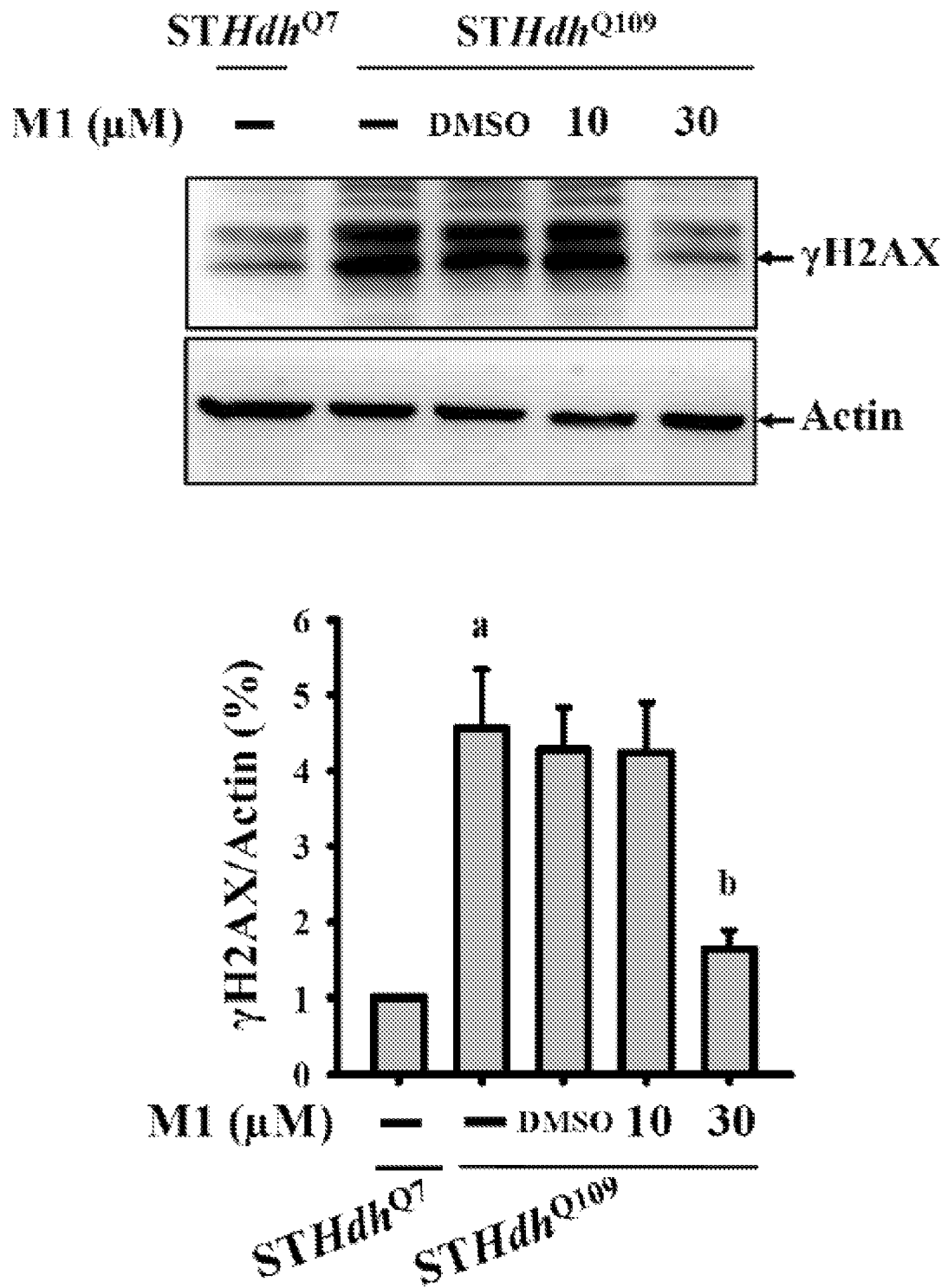
FIG. 5 shows that ginsenoside M1 markedly reduced the expression level of γH2AX in STHdhQ109 cells. STHdh$^{Q7}$ and STHdh$^{Q109}$ cells were treated with 10 or 30 μM ginsenoside M1 or vehicle (0.1% DMSO) for 24 h. The expression level of γH2AX was measured by Western blotting. The Western blotting results are representative of three different experiments and the histogram shows the quantification expressed as the mean±SEM for these three experiments. Multiple groups will analyze with one-way analysis of variance (ANOVA), follow by a post-hoc Student-Newman-Keuls test. p value of <0.05 will considered significant. $^a$p<0.05: between STHdh$^{Q7}$ and STHdh$^{Q109}$ cells. $^b$p<0.05: compared to untreated (vehicle-treated) STHdh$^{Q109}$ cells.

Example 5: Ginsenoside M1 Markedly Reduced the Expression Level of γH2AX in STHdh$^{Q109}$ Cells ATM is now known to regulate DNA repair through the activation of γH2AX. To investigate whether ginsenoside M1 inhibited the expression level of γH2AX, STHdh$^{Q7}$ and STHdh$^{Q109}$ cells were treated with 10 and 30 µM ginsenoside M1 or vehicle (DMSO) for 24 h. The expression level of γH2AX was measured by Western blot. As shown in the FIG. 5, the expression level of γH2AX in untreated (vehicle-treated) STHdh$^{Q109}$ cells was significantly increased compared to the untreated (vehicle-treated) STHdh$^{Q7}$ cells. Notably, 10 and 30 µM ginsenoside M1 significantly reduced the expression level of γH2AX in STHdh$^{Q109}$ cells compared to the untreated (vehicle-treated) STHdh$^{Q109}$ cells. The Western blotting results are representative of three different experiments and the histogram shows the quantification expressed as the mean±SD for these three experiments. Multiple groups will analyze with one-way analysis of variance (ANOVA), follow by a post-hoc Student-Newman-Keuls test. p value of <0.05 will considered significant. $^a$p<0.05: between STHdh$^{Q7}$ and STHdh$^{Q109}$ cells. $^b$p<0.05: compared to untreated (vehicle-treated) STHdh$^{Q109}$ cells.

Figure 6:
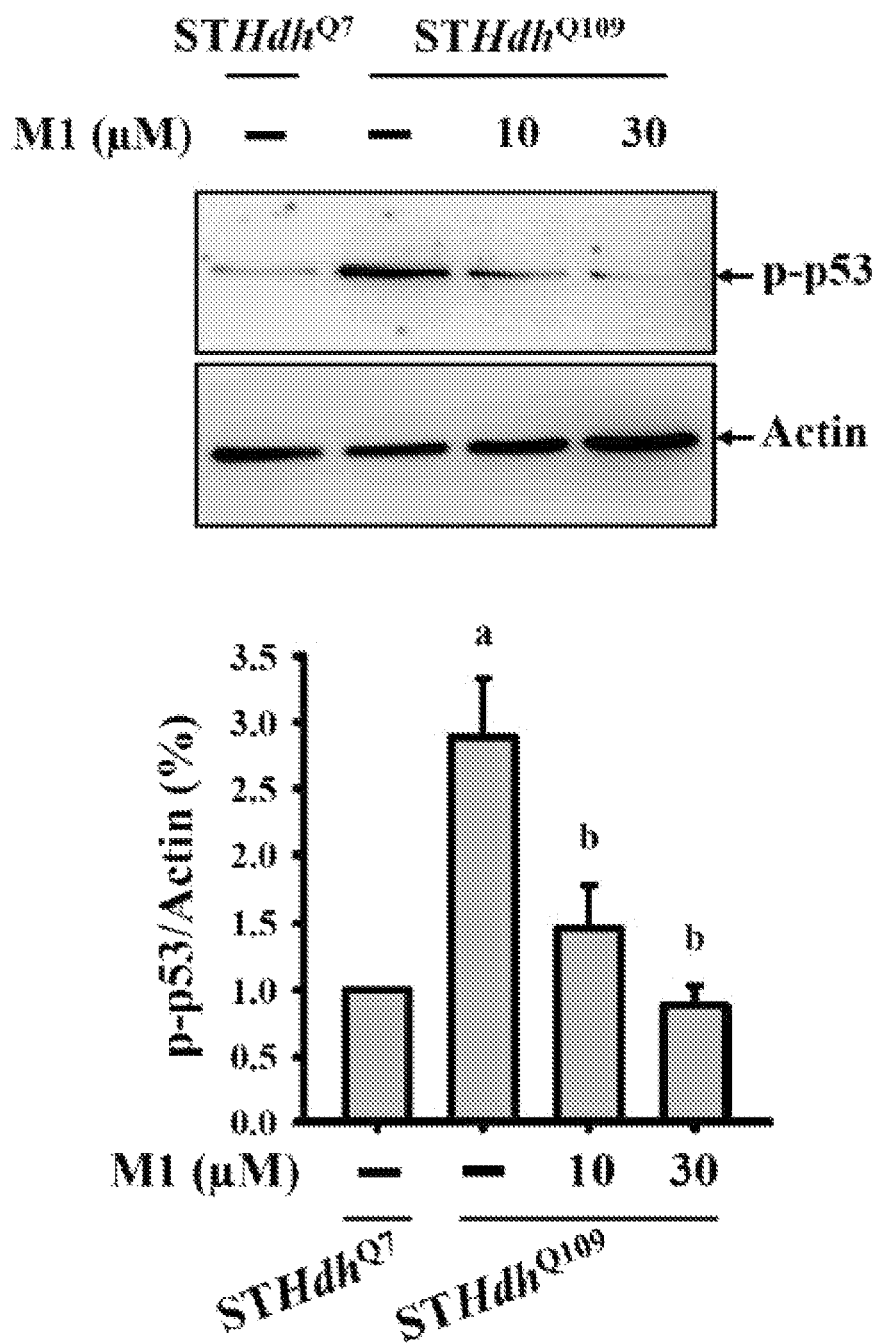
FIG. 6 shows that ginsenoside M1 markedly reduced the phosphorylation level of p53 in STHdhQ109 cells. STHdh$^{Q7}$ and STHdh$^{Q109}$ cells were treated with 10 or 30 μM ginsenoside M1 or vehicle (0.1% DMSO) for 24 h. The phosphorylation level of p53 was measured by Western blotting. The Western blotting results are representative of three different experiments and the histogram shows the quantification expressed as the mean±SEM for these three experiments. Multiple groups will analyze with one-way analysis of variance (ANOVA), follow by a post-hoc Student-Newman-Keuls test. p value of <0.05 will considered significant. $^a$p<0.05: between STHdh$^{Q7}$ and STHdh$^{Q109}$ cells. $^b$p<0.05: compared to untreated (vehicle-treated) STHdh$^{Q109}$ cells.

Example 6: Ginsenoside M1 Markedly Reduced the Phosphorylation Level of p53 in STHdh$^{Q109}$ Cells p53 plays a role in the regulation of the cell cycle and apoptosis. p53 becomes activated in response to DNA damage and oxidative stress. To investigate whether ginsenoside M1 inhibited the phosphorylation level of p53, STHdh$^{Q7}$ and STHdh$^{Q109}$ cells were treated with 10 and 30 µM ginsenoside M1 or vehicle (DMSO) for 24 h. The phosphorylation level of p53 was measured by Western blot. As shown in the FIG. 6, the phosphorylation level of p53 in untreated (vehicle-treated) STHdh$^{Q109}$ cells was significantly increased compared to the untreated (vehicle-treated) STHdh$^{Q7}$ cells. Notably, 10 and 30 µM ginsenoside M1 significantly reduced the phosphorylation level of p53 in STHdh$^{Q109}$ cells compared to the untreated (vehicle-treated) STHdh$^{Q109}$ cells. The Western blotting results are representative of three different experiments and the histogram shows the quantification expressed as the mean±SD for these three experiments. Multiple groups will analyze with one-way analysis of variance (ANOVA), follow by a post-hoc Student-Newman-Keuls test. p value of <0.05 will considered significant. $^a$p<0.05: between STHdh$^{Q7}$ and STHdh$^{Q109}$ cells. $^b$p<0.05: compared to untreated (vehicle-treated) STHdh$^{Q109}$ cells.

Example 7: Oral Administration of Ginsenoside M1 Markedly Reduced the Disease Progression of a Transgenic Mouse Model of HD (R6/2 Mice)

Figure 7:
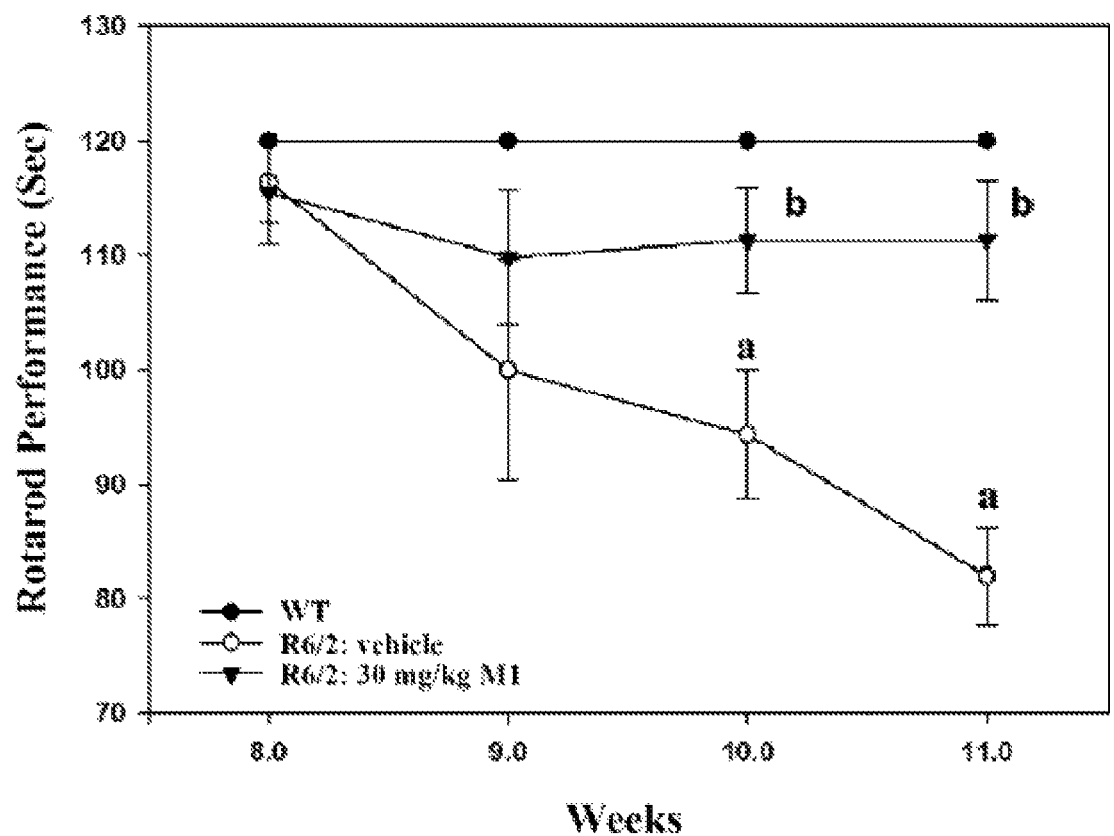
FIG. 7 shows that oral administration of ginsenoside M1 increased significantly the motor coordination of HD disease mice. R6/2 HD disease mice oral administration of ginsenoside M1 (30 mg/kg of body weight) or vehicle daily for 4 weeks from the age of 7 weeks. Wild-type healthy control mice oral administration of vehicle daily. Motor coordination was assessed using a rotarod apparatus assay. Results were expressed as means±SEM. Multiple groups were analyzed by one-way analysis of variance (ANOVA) followed by a post hoc Student-Newman-Keuls test. $^a$p<0.05: between WT and R6/2-vehicle mice. $^b$p<0.05: compared to R6/2-vehicle mice.

Mice were treated daily with ginsenoside M1 (30 mg/kg of body weight, oral administration) or vehicle for 4 weeks from the age of 7 weeks. Motor coordination was assessed using a rotarod apparatus assay (UGO BASILE, Comerio, Italy) at a constant speed (12 rpm) over a period of 2 min. As shown in the FIG. 7, the motor coordination significantly loss in HD disease mice (R6/2) compared to the wild-type mice. Oral administration of ginsenoside M1 increased significantly the motor coordination of HD disease mice. Results were expressed as means±SEM. Multiple groups were analyzed by one-way analysis of variance (ANOVA) followed by a post hoc Student-Newman-Keuls test.

$^a$p<0.05: between WT and R6/2-vehicle mice. $^b$p<0.05: compared to R6/2-vehicle mice.

Example 8: Oral Administration of Ginsenoside M1 Markedly Prolonged the Lifespan of a Transgenic Mouse Model of HD (R6/2 Mice)

Figure 8:
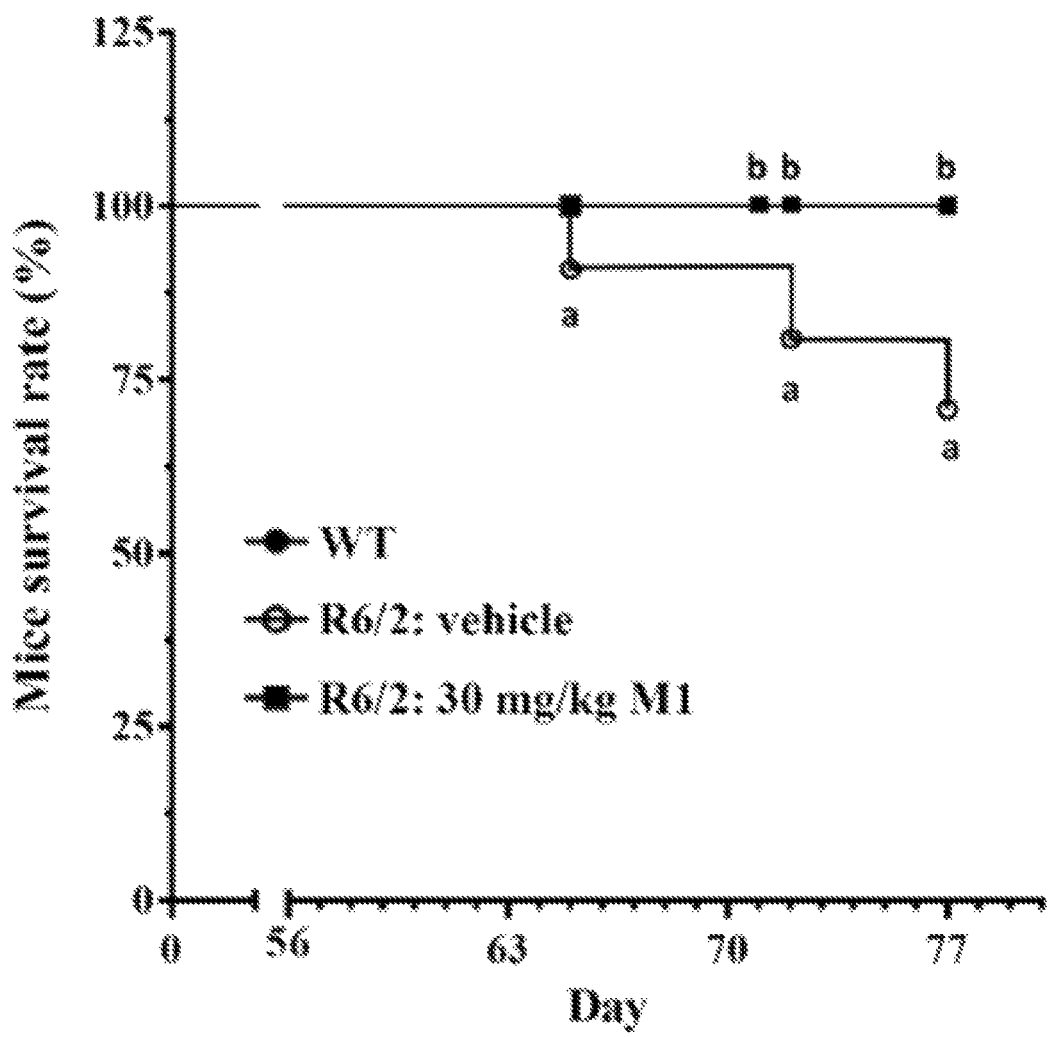
FIG. 8 shows that oral administration of ginsenoside M1 markedly prolonged the lifespan of HD disease mice. R6/2 HD disease mice oral administration of ginsenoside M1 (30 mg/kg of body weight) or vehicle daily for 4 weeks from the age of 7 weeks. Wild-type healthy control mice oral administration of vehicle daily. The lifespan of mice was determined. Results were expressed as means±SEM. Multiple groups were analyzed by one-way analysis of variance (ANOVA) followed by a post hoc Student-Newman-Keuls test. $^a$p<0.05: between WT and R6/2-vehicle mice. $^b$p<0.05: compared to R6/2-vehicle mice.

Mice were treated daily with ginsenoside M1 (30 mg/kg of body weight, oral administration) or vehicle for 4 weeks from the age of 7 weeks, and the lifespan of mice was determined. As shown in the FIG. 8, oral administration of M1 significantly prolonged the lifespan of HD disease mice (R6/2). Results were expressed as means±SEM. Multiple groups were analyzed by one-way analysis of variance (ANOVA) followed by a post hoc Student-Newman-Keuls test. $^a$p<0.05: between WT and R6/2-vehicle mice. $^b$p<0.05: compared to R6/2-vehicle mice.

Example 9: Oral Administration of Ginsenoside M1 Reduced the mHtt Aggregate Formation in the Striatum of HD Disease Mice (R6/2 Mice)

Figure 9:
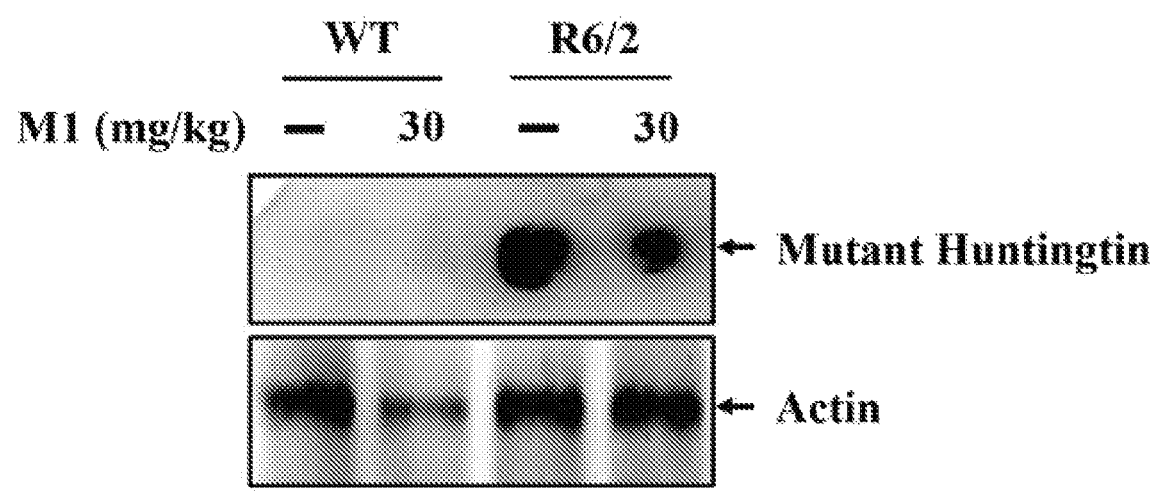
FIG. 9 shows that oral administration of ginsenoside M1 reduced the mHtt aggregate formation in the striatum of HD disease mice. Wild-type healthy control mice and R6/2 HD disease mice oral administration of ginsenoside M1 (30 mg/kg of body weight) or vehicle daily for 4 weeks from the age of 7 weeks. The amount of mHtt aggregates in striatal lysates was analyzed by a filter retardation assay.

Mice were treated daily with ginsenoside M1 (30 mg/kg of body weight, oral administration) or vehicle for 4 weeks from the age of 7 weeks. The amount of mHtt aggregates in striatal lysates was analyzed by a filter retardation assay. Brain tissues were suspended and homogenized in ice-cold THE buffer, mixed with 2% SDS. Samples were first passed through OE66 membrane filters (0.2 mm pore size; Whatman Schleicher and Schuell, Middlesex, UK) in a slot-blot manifold (Bio-Rad, Irvine, CA, USA). Insoluble aggregates retained on the filters were detected using an anti-Htt antibody. As shown in the FIG. 9, the mHtt aggregate formation in the striatum of HD disease mice (R6/2 mice) was significantly increased compared to wild-type mice. Notably, oral administration of ginsenoside M1 reduced the mHtt aggregate formation in the striatum of HD disease mice (R6/2 mice).

It is believed that a person of ordinary knowledge in the art where the present invention belongs can utilize the present invention to its broadest scope based on the descriptions herein with no need of further illustration. Therefore, the descriptions and claims as provided should be understood as of demonstrative purpose instead of limitative in any way to the scope of the present invention.

REFERENCES

1. Martin J B, Gusella J F: Huntington's disease. Pathogenesis and management. *N Engl J Med* 1986, 315:1267-1276.
2. Group. THsDCR: A novel gene containing a trinucleotide repeat that is expanded and unstable on Huntington's disease chromosomes. The Huntington's Disease Collaborative Research Group. *Cell* 1993, 72:971-983.
3. Li H, Li S H, Yu Z X, Shelbourne P, Li X J: Huntingtin aggregate-associated axonal degeneration is an early pathological event in Huntington's disease mice. *J Neurosci* 2001, 21:8473-8481.
4. Gil J M, Rego A C: Mechanisms of neurodegeneration in Huntington's disease. *Eur J Neurosci* 2008, 27:2803-2820.
5. Estrada Sanchez A M, Mejia-Toiber J, Massieu L: Excitotoxic neuronal death and the pathogenesis of Huntington's disease. *Arch Med Res* 2008, 39:265-276.
6. Vonsattel J P, Myers R H, Stevens T J, Ferrante R J, Bird E D, Richardson E P, Jr.: Neuropathological classification of Huntington's disease. *J Neuropathol Exp Neurol* 1985, 44:559-577.
7. Pratley R E, Salbe A D, Ravussin E, Caviness J N: Higher sedentary energy expenditure in patients with Huntington's disease. *Ann Neurol* 2000, 47:64-70.
8. Hurlbert M S, Zhou W, Wasmeier C, Kaddis F G, Hutton J C, Freed C R: Mice transgenic for an expanded CAG repeat in the Huntington's disease gene develop diabetes. *Diabetes* 1999, 48:649-651.
9. Valenza M, Carroll J B, Leoni V, Bertram L N, Bjorkhem I, Singaraja R R, Di Donato S, Lutjohann D, Hayden M R, Cattaneo E: Cholesterol biosynthesis pathway is disturbed in YAC128 mice and is modulated by huntingtin mutation. *Hum Mol Genet* 2007, 16:2187-2198.
10. Chiang M-C, Chen H-M, Lee Y-H, Chang H-H, Wu Y-C, Soong B-W, Chen C-M, Wu Y-R, Liu C-S, Niu D-M, et al: Dysregulation of C/EBP{alpha} by mutant Huntingtin causes the urea cycle deficiency in Huntington's disease. *Hum Mol Genet* 2007, 16:483-498.
11. Long Y C, Zierath J R: AMP-activated protein kinase signaling in metabolic regulation. *J Clin Invest* 2006, 116:1776-1783.
12. Kahn B B, Alquier T, Carling D, Hardie D G: AMP-activated protein kinase: ancient energy gauge provides clues to modern understanding of metabolism. *Cell Metab* 2005, 1:15-25.
13. Stein S C, Woods A, Jones N A, Davison M D, Carling D: The regulation of AMP-activated protein kinase by phosphorylation. *Biochem J* 2000, 345 Pt 3:437-443.
14. Hurley R L, Barre L K, Wood S D, Anderson K A, Kemp B E, Means A R, Witters L A: Regulation of AMP-activated protein kinase by multisite phosphorylation in response to agents that elevate cellular cAMP. *J Biol Chem* 2006, 281:36662-36672.
15. Raney M A, Turcotte L P: Evidence for the involvement of CaMKII and AMPK in Ca2+-dependent signaling pathways regulating FA uptake and oxidation in contracting rodent muscle. *J Appl Physiol* 2008, 104:1366-1373.
16. Fryer L G, Parbu-Patel A, Carling D: The Anti-diabetic drugs rosiglitazone and metformin stimulate AMP-activated protein kinase through distinct signaling pathways. *J Biol Chem* 2002, 277:25226-25232.
17. Woods A, Dickerson K, Heath R, Hong S P, Momcilovic M, Johnstone S R, Carlson M, Carling D: Ca2+/calmodulin-dependent protein kinase kinase-beta acts upstream of AMP-activated protein kinase in mammalian cells. *Cell Metab* 2005, 2:21-33.
18. Stapleton D, Mitchelhill K I, Gao G, Widmer J, Michell B J, Teh T, House C M, Fernandez C S, Cox T, Witters L A, Kemp B E: Mammalian AMP-activated protein kinase subfamily. *J Biol Chem* 1996, 271:611-614.
19. Tsuboi T, da Silva Xavier G, Leclerc I, Rutter G A: 5'-AMP-activated protein kinase controls insulin-containing secretory vesicle dynamics. *J Biol Chem* 2003, 278: 52042-52051.
20. Cai Y, Martens G A, Hinke S A, Heimberg H, Pipeleers D, Van de Casteele M: Increased oxygen radical formation and mitochondrial dysfunction mediate beta cell apoptosis under conditions of AMP-activated protein kinase stimulation. *Free Radic Biol Med* 2007, 42:64-78.
21. Ju T C, Chen H M, Chen Y C, Chang C P, Chang C, Chern Y: AMPK-alphal functions downstream of oxidative stress to mediate neuronal atrophy in Huntington's disease. *Biochim Biophys Acta* 2014, 1842:1668-1680.

22. Hong Y H, Varanasi U S, Yang W, Leff T: AMP-activated protein kinase regulates HNF4alpha transcriptional activity by inhibiting dimer formation and decreasing protein stability. *J Biol Chem* 2003, 278:27495-27501.
23. Okoshi R, Ozaki T, Yamamoto H, Ando K, Koida N, Ono S, Koda T, Kamijo T, Nakagawara A, Kizaki H: Activation of AMP-activated protein kinase induces p53-dependent apoptotic cell death in response to energetic stress. *J Biol Chem* 2008, 283:3979-3987.
24. Li J, Jiang P, Robinson M, Lawrence T S, Sun Y: AMPK-beta1 subunit is a p53-independent stress responsive protein that inhibits tumor cell growth upon forced expression. *Carcinogenesis* 2003, 24:827-834.
25. Kefas B A, Cai Y, Kerckhofs K, Ling Z, Martens G, Heimberg H, Pipeleers D, Van de Casteele M: Metformin-induced stimulation of AMP-activated protein kinase in beta-cells impairs their glucose responsiveness and can lead to apoptosis. *Biochem Pharmacol* 2004, 68:409-416.
26. Cai Y, Wang Q, Ling Z, Pipeleers D, McDermott P, Pende M, Heimberg H, Van de Casteele M: Akt activation protects pancreatic beta cells from AMPK-mediated death through stimulation of mTOR. *Biochem Pharmacol* 2008, 75:1981-1993.
27. Pederson G T, Gray S T, Woodhouse C A, Betancourt J L, Fagre D B, Littell J S, Watson E, Luckman B H, Graumlich L J: The unusual nature of recent snowpack declines in the North American cordillera. *Science* 2011, 333:332-335.
28. Minokoshi Y, Alquier T, Furukawa N, Kim Y B, Lee A, Xue B, Mu J, Foufelle F, Ferre P, Birnbaum M J, et al: AMP-kinase regulates food intake by responding to hormonal and nutrient signals in the hypothalamus. *Nature* 2004, 428:569-574.
29. McCullough L D, Zeng Z, Li H, Landree L E, McFadden J, Ronnett G V: Pharmacological inhibition of AMP-activated protein kinase provides neuroprotection in stroke. *J Biol Chem* 2005, 280:20493-20502.
30. Lopez-Lopez C, Dietrich M O, Metzger F, Loetscher H, Torres-Aleman I: Disturbed cross talk between insulin-like growth factor I and AMP-activated protein kinase as a possible cause of vascular dysfunction in the amyloid precursor protein/presenilin 2 mouse model of Alzheimer's disease. *J Neurosci* 2007, 27:824-831.
31. Chou S Y, Lee Y C, Chen H M, Chiang M C, Lai H L, Chang H H, Wu Y C, Sun C N, Chien C L, Lin Y S, et al: CGS21680 attenuates symptoms of Huntington's disease in a transgenic mouse model. *J Neurochem* 2005, 93:310-320.
32. Li J, Zeng Z, Viollet B, Ronnett G V, McCullough L D: Neuroprotective effects of adenosine monophosphate-activated protein kinase inhibition and gene deletion in stroke. *Stroke* 2007, 38:2992-2999.
33. Chen Y, Zhou K, Wang R, Liu Y, Kwak Y D, Ma T, Thompson R C, Zhao Y, Smith L, Gasparini L, et al: Antidiabetic drug metformin (GlucophageR) increases biogenesis of Alzheimer's amyloid peptides via up-regulating B ACE1 transcription. *Proc Natl Acad Sci USA* 2009, 106:3907-3912.
34. Thornton C, Bright N J, Sastre M, Muckett P J, Carling D: AMP-activated protein kinase (AMPK) is a tau kinase, activated in response to amyloid beta-peptide exposure. *Biochem J* 2011, 434:503-512.
Vingtdeux V, Davies P, Dickson D W, Marambaud P: AMPK is abnormally activated in tangle- and pre-tangle-bearing neurons in Alzheimer's disease and other tauopathies. *Acta Neuropathol* 2011, 121:337-349.
35. Greco S J, Sarkar S, Johnston J M, Tezapsidis N: Leptin regulates tau phosphorylation and amyloid through AMPK in neuronal cells. *Biochem Biophys Res Commun* 2009, 380:98-104.
36. Ju T C, Chen H M, Lin J T, Chang C P, Chang W C, Kang J J, Sun C P, Tao M H, Tu P H, Chang C, et al: Nuclear translocation of AMPK-{alpha}1 potentiates striatal neurodegeneration in Huntington's disease. *J Cell Biol* 2011.
37. Guo Z, Kozlov S, Lavin M F, Person M D, Paull T T: ATM activation by oxidative stress. *Science* 2010, 330:517-521.
38. Giuliano P, De Cristofaro T, Affaitati A, Pizzulo G M, Feliciello A, Criscuolo C, De Michele G, Filla A, Avvedimento E V, Varrone S: DNA damage induced by polyglutamine-expanded proteins. *Hum Mol Genet* 2003, 12:2301-2309.
39. Suzuki A, Kusakai G, Kishimoto A, Shimojo Y, Ogura T, Lavin M F, Esumi H: IGF-1 phosphorylates AMPK-alpha subunit in ATM-dependent and LKB1-independent manner. *Biochem Biophys Res Commun* 2004, 324:986-992.
40. Sanli T, Rashid A, Liu C, Harding S, Bristow R G, Cutz J C, Singh G, Wright J, Tsakiridis T: Ionizing radiation activates AMP-activated kinase (AMPK): a target for radiosensitization of human cancer cells. *Int J Radiat Oncol Biol Phys* 2010, 78:221-229.
41. Sun Y, Connors K E, Yang D Q: AICAR induces phosphorylation of AMPK in an ATM-dependent, LKB1-independent manner. *Mol Cell Biochem* 2007, 306:239-245.
42. Fu X, Wan S, Lyu Y L, Liu L F, Qi H: Etoposide induces ATM-dependent mitochondrial biogenesis through AMPK activation. *PLoS One* 2008, 3:e2009.
43. Xie X, Wang H T, Li C L, Gao X H, Ding J L, Zhao H H, Lu Y L: Ginsenoside Rb 1 protects PC12 cells against beta-amyloid-induced cell injury. *Mol Med Rep* 2010, 3:635-639.

We claim:

1. A method of reducing mHtt aggregate formation in the striatum of a Huntington's disease (HD) patient comprising: orally administering an effective amount of ginsenoside M1 to the patient, wherein the patient expresses a mutant HTT protein and the mutant HTT protein is accumulated in neurons of the patient, and wherein a dosage of the ginsenoside M1 is 100 to 300 mg/kg daily or 25 to 100 mg/kg daily, and the ginsenoside M1 is orally administered for at least 15 days.

2. The method of claim 1, wherein a dosage of the ginsenoside M1 is 30 mg/kg daily, and the ginsenoside M1 is orally administered for 4 weeks.

* * * * *